United States Patent Office 3,268,323
Patented August 23, 1966

3,268,323
METHOD FOR REGULATING PLANT GROWTH
Lewis Edward Goyette, Richmond, Va., assignor to Mobil Oil Corporation, a corporation of New York
No Drawing. Filed Feb. 24, 1961, Ser. No. 91,324
4 Claims. (Cl. 71—2.3)

This invention relates to a method for regulating the growth of plants, and, more particularly, relates to the use of a group of compounds which exhibits remarkable growth regulatory action when applied to plants, bulbs, seeds, and other forms of plant life. This is a continuation-in-part of application Serial No. 834,425, filed August 18, 1959, which in turn is a continuation-in-part of application Serial No. 755,883, filed August 19, 1958, both now abandoned.

Many organic compounds, which when applied to some form of plant life, affect the growth thereof in a particular manner, are known as plant-growth regulators and their form of activity usually varies, depending upon the compound applied and the rate of its application. Thus, growth regulators which kill plants are called herbicides, those which cause plants to lose their foliage are called defoliants, and those which cause increased growth are commonly referred to as promoters or growth stimulants. Certain compounds cause a decrease in the growth of the plant and are known as dwarfing or stunting agents. A good dwarfing agent is characterized by its ability to stunt the plant without causing any damage to the plant foliage or any adverse dwarfing of the plant fruit, i.e., the flowers of ornamentals, the edible portion of food crops, etc. Most known growth-regulants have only one or two of the aforementioned types of activity.

It has now been discovered that a compound having the formula:

(I)

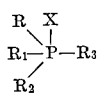

wherein R, $R_1$, $R_2$, and $R_3$ are members selected from the group consisting of alkyl, substituted alkyl, oxoalkyl, substituted and unsubstituted aralkyl and alkenyl radicals and X is an acid radical such as one of those selected from the group consisting of Cl, Br, I, $SO_4$, $NO_3$ and $PO_4$, is truly a plant-growth regulator, inasmuch as it has all of the above properties of defoliating, killing, dwarfing, and stimulating the growth of the plant, seed, bulb, etc., depending upon the amount of and the method of application of the compound to the plant life.

An increasing amount of interest among growers, particularly growers of ornamentals, is developing in dwarfing agents and growth stimulants. Many plants, such as the Easter lily, have attractive flowers but are unsuitable for inside-the-home use because of the disproportionate length of the stems. Many outside plants, such as chrysanthemums, petunias, and privets would be more attractive, and sales thereof would be stimulated, if the stem portions were of decreased size while the size of the blooms would remain the same as that of normal plants. By using the compounds of the invention, it is now possible to treat plants, such as the Easter lily, chrysanthemum, petunia, privet, etc., so as to reduce their size and make them more suitable for home use and outside landscaping, their height being regulated by the amount and type of dwarfing agent used. The compounds of this invention are useful for dwarfing crops grown in places where space is at a premium. For example, the compounds of the invention are exceptionally effective in reducing the size of certain varieties of snap beans without reducing the size of the bean itself.

The compounds of the invention are effective as selective herbicides, i.e., one which selectively kills obnoxious weeds, but not the food crop. Such compounds are not only useful to control weed growth on farms, but also growth along railroad and power line rights-of-way, and other places where weeds are a nuisance and are hard to control.

The compounds of the invention are good defoliants in that they can duplicate the effect of light frost on a plant, causing the formation of abscission layers of cells across the petiole bases of the leaves of the plant, and resulting in premature leaf drop.

While the largest use at the present time for defoliants is in the defoliation of cotton, interest has been shown in defoliants for plants such as roses, hydrangeas, many types of fruit and shade trees and for other field-grown crops, such as soybeans. Cotton plants which have not been treated with defoliant agents have their cotton stained when picked by mechanical pickers. Furthermore, the leaves on the uppermost part of the cotton plant will cause shading of the lower cotton bolls and instances are known where a loss of as much as 15% of the crop due to boll rot has resulted.

Generally speaking, it is extraordinary to discover a compound that possesses more than one or two of the above-named types of activity. For example, it is known that only a very few herbicides are also defoliants, that practically none of the known defoliants are also dwarfing agents, and that pre-emergence and post-emergence herbicidal activity are not necessarily possessed by the same compound. Further, only rarely, if ever, has it occurred that the same compound would, by varying its rate of application possess the ability to stimulate, dwarf or kill some form of plant life. It is thus unexpected to discover a group of compounds that possess more than one or two of these activities.

Broadly, the invention is concerned with the plant-growth regulatory action of compounds encompassed by Formula I which are obtained substantially by the following reaction:

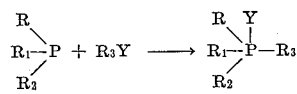

wherein R, $R_1$, $R_2$, $R_3$ have the same meaning as above and Y is Br, Cl, I.

Phosphonium compounds containing other acid anions may be prepared from the above phosphonium halides. For example, the nitrate may be prepared from the phosphonium halide by effecting an ion exchange between it and $AgCO_3$ and adding $HNO_3$ to a water solution of the phosphonium carbonate. The sulfate or phosphate can be made by adding $H_2SO_4$ or $H_3PO_4$, respectively, to a water solution of the phosphonium carbonate. The nitrate can also be prepared by reacting together water solutions of $AgNO_3$ and the phosphonium halide.

Because it is generally easier to prepare phosphines wherein R, $R_1$ and $R_2$ are the same, the majority of the compounds found to be active fall among the compounds defined by the formula:

(II)

wherein all three R's are the same alkyl radicals and $R_3$ and X have the same meaning as given above. The compounds found to be most active and those preferred for use in practice of the invention, fall under the generic Formula II. More specifically, the preferred compounds of the invention are:

(III)

wherein $R_3$ and X have the same meaning as in Formula I. The preferred compounds of Formula III are those wherein $R_3$ is $C_4H_9$, $C_6H_5CH_2$—, $C_6H_5CH_2CH_2$—, $p\text{-}CH_3C_6H_4CH_2$—
$o\text{-}ClC_6H_4CH_2$—, $2,4\text{-}Cl_2C_6H_3CH_2$—, $C_6H_{11}CH_2CH_2$—
$CH_3COCH_2$—, $CH_2\!=\!CHCH_2$—, and a mixture of iso-$C_8H_{15}$ radicals which consists of

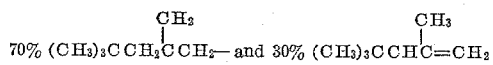

Some of the compounds which fall under general Formula II, and which may be used in the practice of this invention, are illustrated by the following:

Ethyltrimethylphosphonium chloride or iodide; isoamyltrimethylphosphonium chloride or iodide; benzyltrimethylphosphonium bromide or iodide; triethylmethylphosphonium chloride or iodide; triethylvinylphosphonium chloride or bromide; triethylpropylphosphonium chloride or iodide; allyltriethylphosphonium iodide; isoamyltriethylphosphonium chloride or iodide; triethyloctylphosphonium iodide; dodecyltriethylphosphonium iodide; cetyltriethylphosphonium iodide; benzyltriethylphosphonium chloride, bromide; triethylphenethylphosphonium chloride, methyltripropylphosphonium iodide; ethyltripropylphosphonium iodide; butyltripropylphosphonium iodide; octyltripropylphosphonium chloride, bromide, or iodide; methyltriisopropylphosphonium iodide; tributylmethylphosphonium iodide; tributylethylphosphonium iodide; tributylpropylphosphonium iodide; tributyl-2,2-diphenylethylphosphonium chloride; methyltris(1-methylpropyl)phosphonium iodide; triisobutylmethylphosphonium iodide; triisoamylmethylphosphonium iodide; 4-chlorobenzyltributylphosphonium chloride; 4-bromobenzyltributylphosphonium bromide; and 4-iodobenzyltributylphosphonium iodide and some of the above phosphonium stems with the acid radicals nitrate, sulfate and phosphate.

Other phosphonium compounds which may be used are those which are defined by Formula I above. They can best be categorized as follows:

(a) Phosphonium compounds wherein R, $R_1$, $R_2$, and $R_3$ are the same, e.g., tetramethylphosphonium chloride or iodide; tetraethylphosphonium chloride, bromide, or iodide; tetrapropylphosphonium iodide; tetraisopropylphosphonium iodide; tetrabutylphosphonium iodide; tetraisobutylphosphonium iodide and tetraisoamylphosphonium iodide.

(b) Those wherein R, $R_1$, and $R_2$ are the same nonalkyl radical, e.g., triallylmethylphosphonium iodide; tris(2-methylallyl)methylphosphonium iodide; tribenzylethylphosphonium chloride; and 2,4-dichlorobenzyltriphenylphosphonium chloride.

(c) Those phosphonium compounds wherein two of the R's are the same and the other two are different, e.g., benzyldimethyloctylphosphonium chloride or iodide; benzyldodecyldimethylphosphonium chloride or iodide and benzylcetyldimethylphosphonium chloride or iodide.

(d) Those phosphonium compounds wherein two of the R's are the same, the other two R's are the same also, the two groups being different from each other, e.g., diethyldimethylphosphonium chloride or iodide and dibenzyldiethylphosphonium chloride.

(e) Those wherein all R's are different, e.g., isobutylethylmethylisopropylphosphonium iodide.

Each of the compounds exemplified above come within the definition of Formula I since the radicals, other than X, include alkyl from methyl to cetyl, allyl, 2-methylallyl, vinyl, benzyl, including chlorine substituted benzyl, bromine substituted benzyl, iodine substituted benzyl, and methyl substituted benzyl, 2,2-diphenyl ethyl, phenethyl, and $CH_3COCH_2$—.

The above phosphonium halide compounds may be prepared by any known method, such as the method disclosed in U.S. Patent No. 2,703,814. One method by which the compounds have been prepared is to add a slight (ca. 5%) excess of the appropriate organic halide to a cold solution of the phosphine in a solvent, and following a brief heating period (reflux) to complete the reaction, removing the solvent and excess halide. The product is usually a white solid which requires no further purification for use as a plant-growth regulant. General methods for their conversion to the nitrates, sulfates and phosphates were discussed above. Specific methods for preparing phosphonium nitrates and sulfates from phosphonium halides are illustrated by the following examples.

A 90% yield of tetrabutylphosphonium nitrate was obtained by dissolving a quantity of tetrabutylphosphonium bromide in water (about 3 ml. of water per gram of bromide), adding this to a solution of an equimolar amount of silver nitrate in water (about 5 ml. of water per gram of silver nitrate), removing the precipitated silver bromide by filtration and concentrating the filtrate at 50° C. at a pressure of about 30 mm. of mercury.

Tetrabutylphosphonium sulfate was prepared in the following manner. A solution of 0.15 mole of sodium carbonate in 100 ml. of water was added to a stirred solution of 0.3 mole of silver nitrate in 200 ml. of water. The mixture was filtered and the precipitate was washed thoroughly with water. The wet silver carbonate was added to a solution of 0.2 mole of tetrabutylphosphonium bromide in 250 ml. of water and the suspension was agitated for approximately eight hours. The precipitate was then removed by filtration. 0.1 mole of concentrated sulfuric acid in 75 ml. of water was added to the filtrate and the solution was concentrated to dryness at 50° C. and 30 mm. of mercury. 100 ml. of benzene was added to the concentrate and the solution was again concentrated to dryness at 50° C. and 30 mm. of mercury to remove the residual water.

The term "plant-growth regulant" and other similar expressions used in this application, are intended to encompass not only the ability of dwarfing, killing, defoliation, inhibition, etc., plant life, but also the stimulation of plant growth.

To achieve the desired plant-regulatory action of the plants, bulbs, seeds, etc., the compounds may be applied in the form of solutions, emulsions, dust formulations, pastes, and the like.

A liquid formulation of the active phosphonium ingredient containing an acid radical may contain an emulsifier for the ingredient, such as Tween 20 (polyoxyethylene sorbitan monolaurate), ATLOX G–2081, which is a mixture of 30% alkyl aryl sulfonates and 70% polyoxyethylene sorbitan esters of mixed fatty and resin acids, or like emulsifying agents. Tween 20 and ATLOX G–2081 are two of many emulsifiers sold by Atlas Powder Company, Wilmington, Delaware. The emulsifier is present in small quantities, usually about 20% of the total weight of the formulation when used for lanolin paste formulations (the lanolin is used at the rate of about 2 grams per 24 mg. of active compound), and about 2 to 10 drops of emulsifier per gram of active compound when an aqueous emulsion is desired.

In preparing an aqueous emulsion, the compound is mixed with an emulsifier, and both are then dissolved in acetone or other suitable solvents. Any solvent wherein the active compound and emulsifier are soluble may be used provided that (1) it is volatile enough to evaporate from the plant shortly after application, and (2) it is not phytotoxic to the plant being treated. Water may be used to dilute the solution to give the desired concentration of active compound. If the compound is water-soluble, it is merely dissolved therein to give the needed concentration and there is no need for any additional solvent.

Dust formulations using pyrax, attaclay, and the like, are prepared by mixing the carrier and active ingredient in the desired proportions and grinding to the prescribed mesh size. Granular formulations using, for example, 30/60 mesh attaclay are made by adding a solution of active ingredient and an organic solvent such as acetone (usually containing 10% of the compound) to the stirred attaclay, then evaporating the solvent. While attaclay and pyrax are preferred for dust formulations, other solid carriers may be used, such as vermiculite, talc, diatomite, bentonite, oat hulls, walnut shells, wood flour, fertilizer, continental clay, etc.

The dwarfing effect on plants is obtained by applying a lanolin paste of the phosphonium ingredient to the young plant as a continuous band to one side of the first internode. Further, a cutting's ability to form roots may be eliminated if the formulated paste is applied in a continuous band about ½ inch above the cut.

A liquid, dust, or granular formulation containing a known quantity of active compound may be mixed with the soil before the seeds are planted, or the liquid formulation may be applied as a soil drench to the soil planted with seeds, or it may be sprayed directly on the growing plant to obtain the desired effect. Pre-emergence control is usually determined by applying emulsions of the active compound shortly after the seeds are planted, by either the soil mix or the soil drench method. The effect of the phosphonium compounds on the plant after emergence is obtained by applying the active compounds to the growing plant, either as a soil drench or by spraying directly on the plant. Defoliation is accomplished by a modification of the known dip method, i.e., where the first and second true leaves are dipped. In the modification of this method, the cotyledons of the plant are dipped in a solution of the active compound. The plants may also be defoliated by spraying them with an aqueous emulsion containing the phosphonium compound.

The dwarfing effect is always expressed as a function of the reduction in growth of a treated plant as compared to the normal growth of an untreated plant. Where possible, the lengths of the first internode of the control and treated plants are measured and the decrease in internode length of the treated plant is expressed as a percent of the normal internode growth of the control plant. Where this method of measurement is difficult or impossible, the overall height of the plant is measured and compared with the untreated control plants according to the formula:

$$100 - \frac{\text{height of treated plants}}{\text{height of untreated plants}} \times 100 = \% \text{ dwarfing}$$

Plant defoliation results merely relate to the number of leaves which dropped as a percent of the leaves present before treatment. Seed germination and pre-emergence test results are taken by usually counting the number of plants which emerge from a seeded plot containing a known number of seeds. An untreated control plot containing an equal number of seeds is used to act as a guide in determining expected germination for comparison purposes. Post-emergence activity is measurable simply as the number of plants killed or damaged in a plot containing a known number of plants.

The following examples specifically illustrate the various methods of controlling or regulating plant growth with compounds of the invention where the results are measured in the manner indicated above, but it must be understood that the examples are merely illustrative and are in no way limiting with respect to the scope of the invention.

EXAMPLE I

DWARFING WITH COMPOUNDS OF FORMULA III (a) Twenty-five mg. of a number of the compounds having the formula

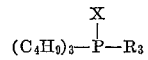

was mixed with 500 mg. of Tween 20 and 2.0 g. of lanolin. The formulation was mixed well and the paste was placed in a continuous band just above the first node of Black Valentine beans one week after planting. The results were taken one week later by measuring the length of the first internode. The results were as follows:

| $R_3$ | X | Percent Growth Inhibition of Snap Beans |
|---|---|---|
| $C_4H_9$ | $NO_3$ | 67.4 |
| $C_4H_9$ | $SO_4$ | 85.5 |
| $C_4H_9$ | I | 84.2 |
| $C_4H_9$ | Br | 100.0 |
| $C_6H_5CH_2$ | Cl | 100.0 |
| $C_6H_5CH_2CH_2$ | Cl | 90.6 |
| $C_6H_5CH_2CH_2$ | Br | 97.3 |
| $p\text{-}CH_3C_6H_4CH_2$ | Cl | 93.6 |
| $o\text{-}ClC_6H_4CH_2$ | Cl | 96.5 |
| $2,4\text{-}Cl_2C_6H_3CH_2$ | $NO_3$ | 92.3 |
| $2,4\text{-}Cl_2C_6H_3CH_2$ | Cl | 100.0 |
| $\text{Cyclo-}C_6H_{11}CH_2CH_2$ | Br | 94.1 |
| $CH_3COCH_2$ | Cl | 48.0 |
| $CH_2\!=\!CHCH_2$ | Cl | 84.7 |
| $\text{iso-}C_8H_{15}$ | Cl | 100.0 |

(b) One hundred and twenty-five ml. of a 100 p.p.m. aqueous solution of the test compound of Formula III was formulated with 5 drops of Tween 20 and 10 ml. of acetone and mixed with soil sufficient for three four-inch pots. Soybeans were seeded in and covered with the treated soil. Two weeks after sowing, the soybeans were thinned to two plants per pot. Four weeks after treatment, stem lengths were recorded.

| $R_3$ | X | Percent Growth Inhibition of Soybeans |
|---|---|---|
| $C_4H_9$ | I | 25.0 |
| $C_4H_9$ | Br | 10.0 |
| $C_6H_5CH_2CH_2$ | Cl | 27.3 |
| $C_6H_5CH_2CH_2$ | Br | 21.0 |
| $p\text{-}CH_3C_6H_4CH_2$ | Cl | 53.0 |
| $\text{Cyclo-}C_6H_{11}CH_2CH_2$ | Br | 37.0 |
| $o\text{-}ClC_6H_4CH_2$ | Cl | 42.0 |
| $CH_3COCH_2$ | Cl | 33.0 |
| $\text{iso-}C_8H_{15}$ | Cl | 42.9 |

(c) The following illustrates the soil drench method using two of the compounds of the invention.

Fifty ml. of various concentrations of the active component formulated with emulsifier and acetone, then diluted with water to give the desired concentrations, were applied as soil drenches to four-inch diameter pots just planted with Black Valentine bean seed. After two weeks the results were taken and the growth inhibition compared to growth of untreated plants was recorded.

| Concentration (p.p.m.) | Percent Growth Inhibition | |
|---|---|---|
| | $(C_4H_9)_3\overset{Cl}{\underset{|}{P}}CH_2-\text{C}_6\text{H}_5$ | $(C_4H_9)_3\overset{Cl}{\underset{|}{P}}CH_2-\text{C}_6\text{H}_4-Cl$ (with Cl) |
| 250 | 56 | 48 |
| 500 | 66 | 60 |
| 1,000 | 74 | 70 |

(d) Two hundred ml. of a 2000 p.p.m. solution of a compound of Formula III (formulated with 10 drops of Tween 20 plus 10 ml. of acetone per 1.2 g. of compound plus 590 ml. of water) were mixed with the soil necessary to fill one 7-inch pot. Two privet plants 6 inches tall were planted in this soil-chemical mixture and allowed to grow with normal care (watering, fertilization, pest-control) for a period of two months. After this period of growth, the height of the plant was measured and compared to the untreated control plants. The percent growth inhibition was calculated according to the formula given above. Following were the results:

| $R_3$ | X | Percent Growth Inhibition of Privet |
|---|---|---|
| $C_4H_9$ | I | 53.0 |
| $C_4H_9$ | Br | 50.0 |
| $C_6H_5CH_2$ | Cl | 4.5 |
| $C_6H_5CH_2CH_2$ | Cl | 41.5 |
| $p\text{-}CH_3C_6H_4CH_2$ | Cl | 10.0 |
| $o\text{-}ClC_6H_4CH_2$ | Cl | 15.0 |
| $2,4\text{-}Cl_2C_6H_3CH_2$ | Cl | 16.0 |
| $CH_2=CHCH_2$ | Cl | 38.4 |
| $\text{iso-}C_8H_{15}$ | Cl | 66.9 |

(e) One hundred and twenty-five ml. of a 1000 p.p.m. solution of active component of Formula III (formulated with 10 ml. of acetone per 375 mg. of compound plus 365 ml. of water) or 125 ml. of a 500 p.p.m. solution of chemical was mixed with sufficient soil to fill three 4-inch pots. One rooted chrysanthemum cutting was planted in each pot. A second series of plants was planted in untreated soil which then received a soil drench of the above solutions. Sixty-six days after the application of the solution, measurements were taken of the stems from the soil surface to the base of the flower bed. They were recorded as follows:

(f) One hundred and twenty-five ml. of a 2000 p.p.m. solution of compound of Formula III (formulated with 5 drops of Tween 20 plus 5 ml. of acetone per 250 mg. of compound plus 120 ml. of water) was mixed with sufficient soil to fill three 4-inch pots. Four watermelon seeds were planted in each pot. The plants were thinned to one plant per pot after emergence. The vine length was measured fifty-one days after treatment. The following percents of inhibition were noted:

| $R_3$ | X | Percent Growth Inhibition of Watermelon |
|---|---|---|
| $C_4H_9$ | I | 10.2 |
| $C_4H_9$ | Br | 14.0 |
| $C_6H_5CH_2$ | Cl | 14.7 |
| $C_6H_5CH_2CH_2$ | Cl | 44.1 |
| $o\text{-}ClC_6H_4CH_2$ | Cl | 52.9 |
| $2,4\text{-}Cl_2C_6H_3CH_2$ | Cl | 28.3 |
| $CH_2=CHCH_2$ | Cl | 48.6 |
| $\text{iso-}C_8H_{15}$ | Cl | 40.5 |

(g) To illustrate the inhibition of root formation, tomato plants two to three weeks old were cut, and an annular ring of 1% concentration of the test compound in a lanolin paste was applied approximately one-half inch above the cut. The cuttings were then placed in water to promote root formation. Cuttings which had been treated with benzyltributylphosphonium chloride and tributyl-2,4-dichlorobenzylphosphonium chloride failed to form any roots, whereas untreated cuttings produced roots in a normal manner.

(h) 15 milliliters of various concentrations of emulsions of the test compounds were applied as a soil drench to one-week-old Black Valentine bean plants in four-inch diameter pots. One week later the percent growth in-

*Retardation of Chrysanthemum*
PERCENT GROWTH INHIBITION

| $R_3$ | X | Soil Drench | | Soil Mix | |
|---|---|---|---|---|---|
| | | 500 p.p.m. | 1,000 p.p.m. | 500 p.p.m. | 1,000 p.p.m. |
| $C_4H_9$ | I | 13.1 | 15.4 | 30.1 | 59.4 |
| $C_4H_9$ | Br | 20.6 | 34.1 | 31.6 | 48.9 |
| $C_6H_5CH_2$ | Cl | 45.3 | 21.0 | 40.2 | 50.4 |
| $C_6H_5CH_2CH_2$ | Cl | 21.5 | 43.0 | 45.5 | 60.5 |
| $C_6H_5CH_2CH_2$ | Br | 22.9 | 39.2 | 30.4 | 43.6 |
| $p\text{-}CH_3C_6H_4CH_2$ | Cl | 52.8 | 61.2 | 66.5 | 70.3 |
| $o\text{-}ClC_6H_4CH_2$ | Cl | 43.9 | 20.1 | 39.5 | 49.4 |
| $2,4\text{-}Cl_2C_6H_3CH_2$ | Cl | 48.1 | 45.8 | 45.1 | 54.5 |
| $CH_2=CHCH_2$ | Cl | 5.1 | 25.7 | 24.4 | 27.8 |
| $\text{iso-}C_8H_{15}$ | Cl | 25.2 | 43.9 | 48.1 | 47.0 | hibition compared to growth of untreated plants was recorded. The results were:

| Concentration (p.p.m.) | Percent Growth Inhibition With— | |
|---|---|---|
| | Benzyltributyl-phosphonium Chloride | Tributyl-2,4-dichlorobenzyl-phosphonium Chloride |
| 125 | 60 | 60 |
| 500 | 93 | 93 |
| 1,000 | | 94 |

(i) 15 milliliters of various concentrations of emulsions of the test compounds were sprayed on the foliage of nine Black Valentine bean plants one-week old. These plants were planted three per four-inch diameter pot. After one week the percent growth inhibition compared to untreated plants was recorded.

| Concentration (p.p.m.) | Percent Growth Inhibition With— | |
|---|---|---|
| | Benzyltributyl-phosphonium Chloride | Tributyl-2,4-dichlorobenzyl-phosphonium Chloride |
| 31 | 33 | 33 |
| 62 | 66 | 57 |
| 125 | 80 | 90 |
| 250 | 85 | 92 |
| 500 | 97 | 99 |

(j) Dust formulations (200/300 mesh) containing 10% of tributyl-2,4-dichlorobenzylphosphonium chloride were prepared from attaclay (attapulgite) and pyrax (pyrophillite) by mixing with the active ingredient and carrier and grinding to the desired mesh. Granular (30/60 mesh) attaclay containing 10% of the above named compound was prepared also. This was done by dissolving the active compound in acetone (an approximate 10% solution) and dripping this slowly into the stirred 30/60 mesh attaclay. After the addition was completed, the attaclay containing the compound and acetone was spread on a flat surface to allow evaporation of the acetone.

1.2 g., 0.6 g. and 0.3 g. of each of the above three formulations were placed in 125 ml. of water. Each of these was mixed with sufficient soil to fill three 4-inch pots. In other words, the various formulations were divided such that the tests could be mode in triplicate at three different active ingredient levels. Black Valentine beans were planted in the pots in which the treated soil had been placed. Two weeks later the bean plants were measured and compared to untreated control plants. The percent inhibition figures are averages of the triplicate tests on plants with the same amount of active ingredient.

| Formulation | Mg. Active Ingredient Per Pot | Percent Inhibition |
|---|---|---|
| Pyrax (dust) | 10 | 29.1 |
| | 20 | 46.1 |
| | 40 | 66.6 |
| Attaclay (dust) | 10 | 23.6 |
| | 20 | 29.4 |
| | 40 | 64.0 |
| Attaclay (granular) | 10 | 40.1 |
| | 20 | 53.7 |
| | 40 | 62.0 |

(k) 1000 and 2000 p.p.m. solutions of tributyl-2,4-dichlorobenzylphosphonium nitrate were prepared by dissolving the compound in water containing about 2–3 drops of Tween 20 per 20 ml. The terminal growth above the first two leaves of a seedling cotton plant was removed. Five plants (1 per 4″ pot) were sprayed with the 1000 p.p.m. solution and five with the 2000 p.p.m. solution at the rate of 20 ml. per ⅓ square yard. Growth retardation, based on weight of secondary growth three weeks after treatment was 76.2 and 99.5%, respectively.

In all of the foregoing examples resulting in dwarfing of the plant, the fruit or bloom was generally of the size of the normal, untreated plant.

EXAMPLE II

PRE-EMERGENCE HERBICIDAL ACTIVITY WITH COMPOUNDS OF FORMULAS I AND III

Emulsions of the active component were applied to plantings of turnips, corn, rye grass, and cotton at the rate of 16 lbs. of active ingredient per acre twenty-four hours after planting. Results were taken seven to ten days later.

| $(C_4H_9)_3-\overset{X}{\underset{|}{P}}-R_3$ wherein $R_3$ is— | X | Degree of Injury | | | |
|---|---|---|---|---|---|
| | | Turnip | Corn | Rye Grass | Cotton |
| $C_4H_9$ | Br | Severe | None | None | None. |
| $C_6H_5CH_2$ | Cl | Moderate | do | Slight | Do. |
| $C_6H_5CH_2CH_2$ | Cl | Dead | do | None | Do. |
| $C_6H_5CH_2CH_2$ | Br | do | do | do | Do. |
| $p\text{-}CH_3C_6H_4CH_2$ | Cl | Sev.-Dead. | do | do | Do. |
| $2,4\text{-}Cl_2C_6H_3CH_2$ | Cl | Very Slt. | Very Slt. | Very Slt. | Very Slt. |
| $CH_3COCH_2$ | Cl | Severe | None | None | None. |
| iso-$C_8H_{15}$ | Cl | do | do | do | Do. |

Emulsions of 2,4-dichlorobenzyltriphenylphosphonium chloride were applied to plantings of turnips and rye grass as immediately above, resulting in 15% and 11% control, respectively.

Further pre-emergence tests of tributyl-2,4-dichlorobenzylphosphonium chloride showed stunting of the turnip plants when applied at rates of 8 and 16 pounds per acre. That is, even though the plants emerged, they were retarded in growth compared to untreated plants.

EXAMPLE III

POST-EMERGENCE HERBICIDAL ACTIVITY WITH COMPOUNDS OF FORMULAS III AND I (a) Applications of an emulsion containing the active compounds were made on greenhouse turnips, corn, rye grass and cotton after the plants had grown for approximately ten days. The results were taken seven to ten days later.

| $(C_4H_9)_3-\overset{X}{\underset{|}{P}}-R_3$ wherein $R_3$ is— | X | Lbs. Acre | Degree of Injury ||||
|---|---|---|---|---|---|---|
| | | | Turnip | Corn | Rye Grass | Cotton |
| $C_4H_9$ | Br | 8 | Severe | Very Slt | None | Dead. |
| $C_6H_5CH_2$ | Cl | 5 | | Mod | | Severe. |
| $C_6H_5CH_2CH_2$ | Cl | 8 | Severe, Dead | Mod | None | Dead. |
| $C_6H_5CH_2CH_2$ | Br | 8 | Dead | V. Slt., Slight | V. Slt., Slight | Dead. |
| $p$-$CH_3C_6H_4CH_2$ | Cl | 8 | Severe, Dead | Slight, Mod | V. Slight, Slight | Severe, Dead. |
| $o$-$ClC_6H_4CH_2$ | Cl | 8 | Dead | Severe | Slight | Dead. |
| $2,4$-$Cl_2C_6H_3CH_2$ | Cl | 8 | Dead | Dead | Dead | Do. |
| $CH_3COCH_2$ | Cl | 8 | Slight | V. Slt., Slight | V. Slt | Mod. |
| $CH_2=CHCH_2$ | Cl | 8 | Severe, Dead | Severe | V. Slt | Dead. |
| iso-$C_8H_{15}$ | Cl | 8 | Severe, Dead | Mod., Severe | V. Slt | Severe, Dead. |

(b) Applications of emulsions of 2,4-dichlorobenzyltriphenylphosphonium chloride were applied on greenhouse turnips, rye grass, corn and cotton at the rate of about 8 lbs. per acre. The applications were made after the plants had grown about 10 days. Results, taken seven to ten days later, showed the degree of injury to the test plants to be dead, severe-dead, moderate and severe, respectively.

(c) Further tests were made with the following compounds of Formula III at one, two and four lbs. per acre.

| $R_3$ | X | Lbs. Acre | Degree of Injury ||||||
|---|---|---|---|---|---|---|---|---|
| | | | Bean | Tomato | Corn | Cotton | Turnips | Rye Grass |
| $C_6H_5CH_2$ | Cl | 2 | Dead | Dead | Mod | Dead | Dead | Dead. |
| $C_6H_5CH_2$ | Cl | 1 | | | Mod | Sev | do | Sev. |
| $2,4$-$Cl_2C_6H_3CH_2$ | Cl | 4 | | | Dead | Dead | do | Dead. |
| $2,4$-$Cl_2C_6H_3CH_2$ | Cl | 2 | | | do | do | do | Sev. |
| $2,4$-$Cl_2C_6H_3CH_2$ | Cl | 1 | | | Mod., Sev | Sev | do | Sev. |

(d) Field applications for further testing of post-emergence herbicidal activity were made with certain of the compounds (in emulsions). Corn, cotton, soybean, and peanut seeds were planted in rows two feet apart. Rye grass, mustard, and turnip seed were broadcast over the planted plot. Three weeks after planting, the test compounds of Formula III were sprayed as emulsions on the growing plants. Results were taken one week later.

| $R_3$ | X | Percent Control ||| Degree of Injury ||||
|---|---|---|---|---|---|---|---|---|
| | | Approx. lb./acre | Mustard Turnips | Rye Grass | Corn | Cotton | Soybean | Peanuts |
| $C_6H_5CH_2$ | Cl | 4 | 85 | 10 | Mod | Mod | Sl., Mod | Mod. |
| $C_6H_5CH_2$ | Cl | 8 | 90 | 25 | Mod | Sev | Dead | Mod. |
| $2,4$-$Cl_2C_6H_3CH_2$ | Cl | 4 | 75 | 10 | Mod | Dead | Mod., Sev | Mod. |
| $2,4$-$Cl_2C_6H_3CH_2$ | Cl | 8 | 95 | 25 | Mod | do | Mod., Sev | Sev., Dead. |

(e) A 1000 p.p.m. solution of emulsifiable concentrate was prepared from 100 mg. of compound of formula III, 3 drops of Tween 20, 10 ml. of acetone and 90 ml. of water. Concentrations of 1, 10, and 100 p.p.m. of active ingredient were prepared from this stock solution by dilution with water. 50 ml. of each solution used were placed in a petri dish and 10 dockweed plants (an aquatic plant) were placed in the dish. Observations were taken one week later. The results are as follows:

| $R_3$ | X | P.p.m. | Percent Kill |
|---|---|---|---|
| $C_4H_9$ | I | 1 | 100 |
| | | 10 | 100 |
| | | 100 | 100 |
| $C_6H_5CH_2CH_2$ | Cl | 10 | 100 |
| | | 100 | 100 |
| $C_6H_5CH_2CH_2$ | Br | 10 | 10 |
| | | 100 | 100 |
| $p$-$CH_3C_6H_4CH_2$ | Br | 10 | 100 |
| | | 100 | 100 |
| $o$-$ClC_6H_4CH_2$ | Cl | 10 | 95 |
| | | 100 | 100 |

(f) Excised cuttings of five aquatic plants, namely, Pithophora sp. (a branched filamentous algae), Najas guadulapensis, Potamogeton diversifiolius, Heteranthera dubia (water star-grass) and Anacharis canadensis (elodea) were growth for five weeks and then treated with a concentration of 5 or 100 p.p.m. of tetrabutylphosphonium iodide, and then maintained for 3 weeks before evaluation.

| Plant | Percent Kill ||
|---|---|---|
| | 5 p.p.m. | 100 p.p.m. |
| Pithophora | 95 | 100 |
| Najas | 100 | 100 |
| Potamogeton | 97 | 100 |
| Water Star-grass | 88 | 100 |
| Elodea | 97 | 100 |

EXAMPLE IV

DEFOLIATION WITH COMPOUNDS OF FORMULA III (a) An emulsifiable concentrate was made by dissolving one gram of benzyltributylphosphonium chloride in five ml. of acetone and adding two drops of Atlox G-2081. This emulsifiable concentrate was diluted with water to give an active ingredient concentration of 500 parts per million (p.p.m.). The emulsion was employed in a modified greenhouse cotton cotyledon method for determining defoliant activity described at page 48 of the Proceedings of the Ninth Annual Beltwide Cotton Defoliation Conference, Memphis, Tennessee, January 13, 14, 1955. In the modified method only the cotyledons were dipped, whereas in the above procedure the first and second true leaves were dipped. Four days after dipping, 10% abscission was observed, i.e., the number of cotyledons abscissed divided by the original number treated multiplied by 100 equals percent abscission. After six days 60% abscission was noted.

(b) A 5000 p.p.m. emulsion of tributyl-2,4-dichlorobenzylphosphonium chloride was prepared in a manner similar to the immediately-above method. Fifty ml. of this emulsion were sprayed on eight three-month-old greenhouse cotton plants. After seven days, 75% defoliation was observed. In a duplicate test, 66% defoliation occurred.

(c) The defoliation of ornamental plants by tributyl-2,4-dichlorobenzylphosphonium chloride when used at the rates of 4 lbs./acre formulated as an emulsifiable concentrate in methyl ethyl ketone, 4 lbs./acre and 8 lbs./acre, these latter two formulated as wettable powders, was as follows (in percent): Privet—37, 25 and 37, respectively; Lucidum—25, 25 and 25, respectively; Japanese Holly—0, 0 and 10, respectively; and Pepersomium—25, 0 and 10, respectively.

(d) Black Valentine snap beans were planted in pots and were spaced over a ⅑ square yard of surface. 10 ml. of a 100 p.p.m. solution of tetrabutylphosphonium iodide (prepared with 10 mg. of active compound+10 ml. of water+0.5% of Tween 20) was sprayed on the plants when they were 10 days old. This is equivalent to 0.065 lb./acre. Fourteen days after spraying, there was complete defoliation of the primary leaves.

(e) A 1000 p.p.m. solution of tetrabutylphosphonium iodide was prepared from 3 drops of Tween 20, 100 mg. of compound and 100 ml. of water or 95 ml. of water and 5 ml. of acetone. This was diluted with water to give concentrations of 200 p.p.m. and 800 p.p.m. Black Valentine snap beans were planted in pots and these pots were spaced in a ⅓ square yard of surface. 20 ml. of each concentration was sprayed on plants in this area. The resulting primary leaf drop was recorded 12 days later. This is the spray test in the table below.

Systemic defoliation resulting from the use of compounds of the invention was accomplished as follows:

A 1000 p.p.m. solution of tetrabutylphosphonium iodide was prepared from 200 mg. of active compound and 200 ml. of water. Concentrations of 50, 100 and 200 p.p.m. were prepared by diluting the stock solution with the appropriate amount of water. 125 ml. of each of these concentrations was applied (as a drench) to three replicate pots (41.5 ml. per pot) containing one Black Valentine bean plant each. The primary leaf drop results were taken nine days later. The percent defoliation figures are averages of the three replicate tests at each concentration.

| Spray | | | Systemic (Drench) | |
|---|---|---|---|---|
| P.p.m. | Lbs. Acre | Percent Defoliation | P.p.m. | Percent Defoliation |
| 200 | 0.14 | 60 | 50 | 100 |
| 800 | 0.56 | 100 | 100 | 100 |
| | | | 200 | 33 |

It will be noted from the above table that the soil drench method of defoliation requires less of the compound than does the spray method.

(f) Solutions of 200 and 800 p.p.m. concentrations of allyltributylphosphonium chloride were prepared and applied to bean plants exactly as described for the spray test contained in the table immediately above. 12 days after treatment, there was 20% and 40% defoliation, respectively, of the primary leaves.

(g) Six pots were used in the following test. Cotton seeds were planted in each pot, and the plants were thinned after emergence so that each pot contained two plants. When the plants were about one week old, 41.5 ml. of a 1000 p.p.m. solution of active compound were poured over the soil of three of the pots. 41.5 ml. of a 2000 p.p.m. solution were used in the same manner in each of the other three pots. The active compound was tetrabutylphosphonium iodide. Results taken 15 days later showed a 16.7% defoliation of the primary leaves using the 1000 p.p.m. solution and a 70% defoliation of the primary leaves with the 2000 p.p.m. solution.

(h) The following example illustrates defoliation of the trifoliolate leaves of Black Valentine beans with tetrabutylphosphonium iodide.

A 500 p.p.m. stock solution of the active compound was prepared by mixing together 100 mg. of tetrabutylphosphonium iodide, 5 ml. of acetone, and 195 ml. of water containing 0.5% of Tween 20. This stock solution was diluted with water containing 0.5% of Tween 20 to give solutions of 25, 50, 100 and 250 p.p.m. of active compound. Five pots (1 plant to the pot) were used for testing each concentration (including the 500 p.p.m. solution). 30 ml. of each concentration was sprayed on each group of five plants when they were one month old, and the percent defoliation of the trifoliolate leaves was recorded 8 days later. Following are the results:

| Active compound, p.p.m.: | Percent defoliation |
|---|---|
| 25 | 4.4 |
| 50 | 6.7 |
| 100 | 33.3 |
| 250 | 91.1 |
| 500 | 100.0 |

(i) A 5000 parts per million emulsion of benzyltributylphosphonium chloride gave 18% defoliation of two- to three-month-old castor bean plants. A 5000 parts per million emulsion of tributyl-2,4-dichlorobenzylphosphonium chloride gave 77% defoliation of two- to three-month-old castor bean plants.

(j) 32% defoliation of tomatoes in 7 days occurred when a 5000 parts per million emulsion of tributyl-2,4-dichlorobenzylphosphonium chloride was applied. 25% defoliation was observed on tomatoes in 7 days when the concentration was 2500 parts per million.

EXAMPLE V

SEED GERMINATION WITH COMPOUNDS OF FORMULA III

Solutions of benzyltributylphosphonium chloride and tributyl-2,4-dichlorobenzylphosphonium chloride were applied to turnip and rye grass seed. Enough active ingredient was used to give 1000, 500, 100, 50 and 5 parts per million upon subsequent addition of water. These seed were soaked in solution for one hour, dried and placed in a constant temperature chamber at 28° C. for four days. The percent inhibition of seed germination was then recorded. The results were:

| $R_3$ | X | P.p.m. | Percent Inhibition | |
|---|---|---|---|---|
| | | | Turnips | Rye Grass |
| $C_6H_5CH_2$ | Cl | 1,000 | 100 | 100 |
| $C_6H_5CH_2$ | Cl | 500 | 100 | 100 |
| $C_6H_5CH_2$ | Cl | 100 | 82 | 98 |
| $C_6H_5CH_2$ | Cl | 50 | 32 | 64 |
| $C_6H_5CH_2$ | Cl | 5 | 19 | 20 |
| $2,4-Cl_2C_6H_3CH_2$ | Cl | 1,000 | 100 | 100 |
| $2,4-Cl_2C_6H_3CH_2$ | Cl | 500 | 100 | 100 |
| $2,4-Cl_2C_6H_3CH_2$ | Cl | 100 | 75 | 100 |
| $2,4-Cl_2C_6H_3CH_2$ | Cl | 50 | 40 | 90 |
| $2,4-Cl_2C_6H_3CH_2$ | Cl | 5 | 14 | 17 |

EXAMPLE VI

ONION (WILD GARLIC) ERADICATION WITH COMPOUNDS OF FORMULA III

Clumps of established onion plants were removed from the ground where they had grown naturally and were established in greenhouse pots. 1% emulsions of benzyltributylphosphonium chloride and tributyl-2,4-dichlorobenzylphosphonium chloride were sprayed on the plants. Ten weeks after application, 70% and 86% control, respectively, of these plants was observed.

EXAMPLE VII

GROWTH STIMULATION OF SOYBEANS WITH COMPOUNDS OF FORMULA III

One hundred and twenty-five ml. of a 100 p.p.m. solution of the active chemical was mixed with sufficient soil to fill three 4-inch pots. Five soybean seeds were planted in each pot containing the treated soil. The plants were thinned to two plants per pot 2 weeks after emergence. Two weeks after thinning, the plants were measured and the growth was compared to an untreated plant. The percent of growth in excess of the untreated is the average obtained from the measurement of the six treated plants.

| $R_3$ | X | Percent Growth Stimulation |
|---|---|---|
| $C_4H_9$ | I | 10.0 |
| $C_4H_9$ | Br | 9.0 |
| 2,4-$Cl_2C_6H_3CH_2$ | Cl | 7.5 |

Stimulation of tiller growth of Concho (winter) wheat was obtained by soaking the seed for one hour in a 100 and 1000 p.p.m. solution of tributyl 2,4-dichlorobenzylphosphonium chloride prior to planting. The average number of tillers from ten plants in the tillering stage of growth were 33.6 and 40.7, respectively, as compared with 27.4 for the untreated wheat.

Stimulation of tiller growth in Lee (spring) wheat was obtained by soaking the seed for one hour in a 100 and 1000 p.p.m. solution of benzyltributylphosphonium chloride prior to planting. The average number of tillers was 19.5 and 19.7 as compared with 16.0 for the untreated wheat.

As seen from the large number of illustrative examples, the effective amount of the active phosphonium ingredient varies with the particular effect desired, method of application, and particular plants, seeds, and the like being treated. Although from 1 to 10,000 parts per million of compound have been disclosed, it will be apparent to those skilled in the art that while optimum results can be obtained within this range for most applications, using concentrations of active ingredient outside this range will also produce certain of the desired results.

When reference is made to spraying the plants in the above disclosure, it is to be understood that the leaves, etc., were sprayed to saturation, i.e., to the point of solution drop-off. Further the emulsions of the compounds of the invention utilized for the various tests disclosed in the above examples were prepared in a manner similar to that which is described in several of the examples. Finally, the term "soil drench" as used in this disclosure is well known in the art as meaning applying the composition to the soil and washing it in with water.

Having described the invention, what is claimed is:

1. The method of defoliating a plant which comprises applying thereto a defoliating amount of the compound having the formula

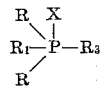

wherein R, $R_1$, $R_2$, and $R_3$ are members selected from the group consisting of alkyl having from 1 to 16 C atoms, allyl, 2-methylallyl, benzyl, alkyl-substituted benzyl, chlorine-substituted benzyl, iodo-substituted benzyl, bromine-substituted benzyl, phenethyl, 2,2-diphenyl ethyl, vinyl, and $CH_3COCH_2$-radicals, and X is a member selected from the group consisting of Br, Cl, I, $NO_3$, $PO_4$ and $SO_4$.

2. The method of regulating the growth of plants, seeds, and bulbs, which comprises applying thereto a growth-regulating amount of benzyltributylphosphonium chloride.

3. The method of regulating the growth of plants, seeds, and bulbs, which comprises applying thereto a growth-regulating amount of tributyl-2,4-dichlorobenzylphosphonium chloride.

4. The method of regulating the growth of plants, seeds, and bulbs, which comprises applying thereto a growth-regulating amount of tributylacetonylphosphonium chloride.

References Cited by the Examiner

UNITED STATES PATENTS

| | | | |
|---|---|---|---|
| 1,921,364 | 8/1933 | Lommel et al. | 260—606.5 |
| 2,703,814 | 3/1955 | Dye | 260—606.5 |
| 2,774,658 | 12/1956 | Dye | 71—2.7 |
| 2,785,967 | 3/1957 | Dye | 71—2.3 |
| 2,855,285 | 10/1958 | Antognini | 71—1 |
| 2,946,824 | 7/1960 | Chiddix et al. | 260—606.5 |
| 3,230,069 | 1/1966 | Preston | 71—2.7 |

LEWIS GOTTS, *Primary Examiner.*

MAURICE A. BRINDISI, JULIAN S. LEVITT,
*Examiners.*

E. J. MEROS, J. O. THOMAS, *Assistant Examiners.*